United States Patent

Kawarazaki et al.

[11] Patent Number: 5,910,718
[45] Date of Patent: Jun. 8, 1999

[54] MOTOR CONTROL APPARATUS

[75] Inventors: Yoshiharu Kawarazaki; Yasushi Nishibe; Hitoshi Iwata, all of Aichi-ken, Japan

[73] Assignee: Kabushiki Kaisha Tokai-Rika-Denki-Seisakusho, Aichi-ken, Japan

[21] Appl. No.: 08/917,219

[22] Filed: Aug. 25, 1997

[30] Foreign Application Priority Data

Aug. 30, 1996 [JP] Japan ..................................... 8-231045

[51] Int. Cl.$^6$ ........................... H02K 17/34; B60K 20/00
[52] U.S. Cl. ........................... 318/447; 318/266; 318/452
[58] Field of Search ................................... 318/260–268, 318/446–480; 340/438, 545; 49/26, 28

[56] References Cited

U.S. PATENT DOCUMENTS

| | | | |
|---|---|---|---|
| 4,611,154 | 9/1986 | Lambropoulos et al. | 318/490 |
| 5,689,160 | 11/1997 | Shigematsu et al. | 318/281 |
| 5,723,959 | 3/1998 | Iwata et al. | 318/447 |
| 5,754,017 | 5/1998 | Tsuge et al. | 318/286 |
| 5,773,942 | 6/1998 | Takahara et al. | 318/280 |
| 5,774,046 | 6/1998 | Ishihara et al. | 340/438 |

FOREIGN PATENT DOCUMENTS 2 158 613  11/1985  United Kingdom.

*Primary Examiner*—Paul Ip
*Attorney, Agent, or Firm*—Sixbey Friedman Leedom & Ferguson; Thomas W. Cole

[57] ABSTRACT

A control circuit outputs a first signal at a predetermined period in the case of being in a normal state and in the case of not being in a normal state, stops the output of the first signal at the predetermined period and outputs a third signal for controlling a motor on the basis of a second signal at a time when a switch SW is operated. In the case that the control circuit is not in a normal state, the first signal is not output at the predetermined period, a fifth signal is output from an output circuit and the second signal passes through a second gate circuit. Then, a drive circuit drives the motor by the second signal passing through the second gate circuit.

20 Claims, 7 Drawing Sheets

F I G. 1
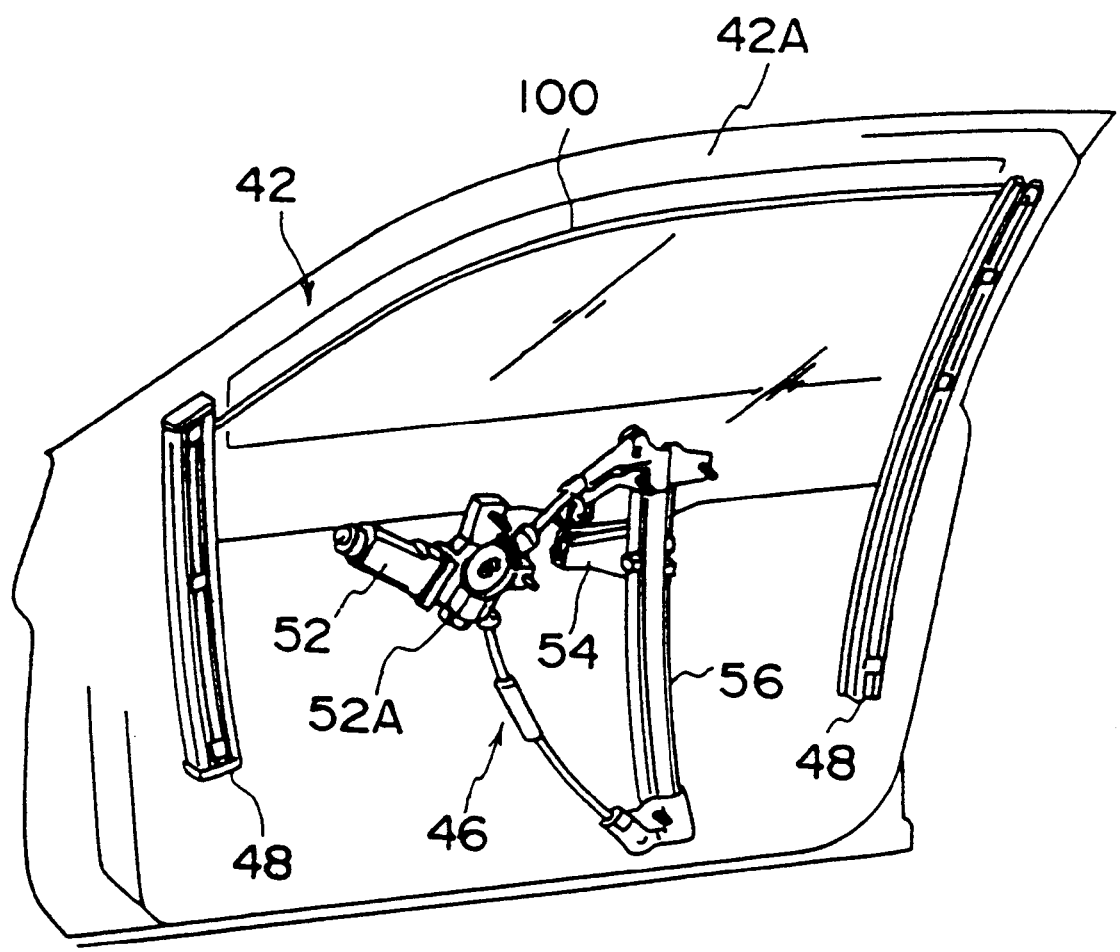

F I G. 5 A
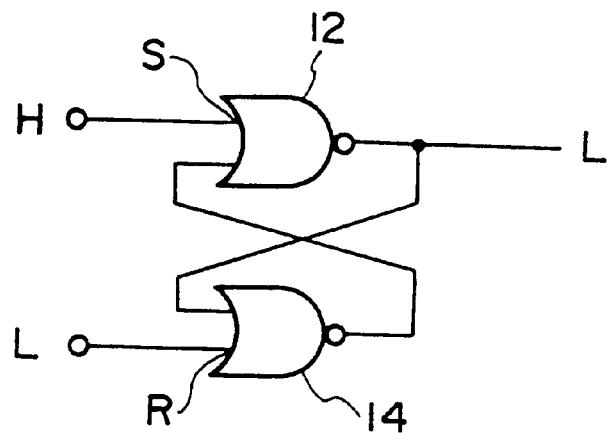
F I G. 5 B
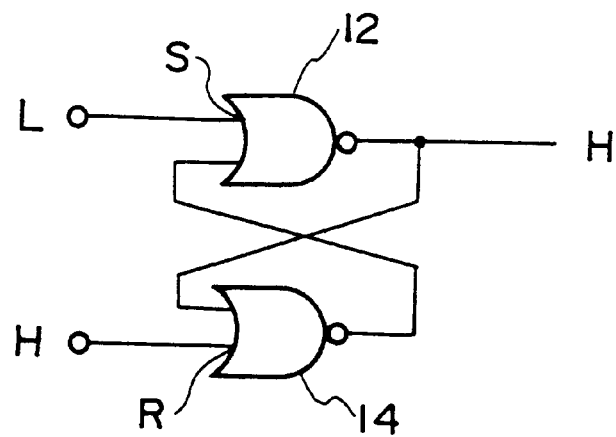

MOTOR CONTROL APPARATUS

BACKGROUND OF THE INVENTION

1. Field of the Invention

The present invention relates to a motor control apparatus and more particularly to a motor control apparatus for controlling a motor in response to a switch operation.

2. Related Art

Conventionally, there is suggested a power window system in which a microcomputer controls a relay and the like in response to a switch operation so as to drive a motor.

In the power window system, there is the possibility that an open and close operation of the power window cannot be controlled due to the microcomputer becoming uncontrollable and the like, which is inconvenient. In order to prevent this, control of a microcomputer by using a watchdog circuit has been proposed. However, since the watchdog circuit can only restart the microcomputer but cannot control an operation signal when the switch is operated, when the runaway of the microcomputer is maintained, the motor cannot be controlled and the convenience of the system deteriorates.

In order to prevent this problem, there is suggested a power window system having a multiplex control system comprising a microcomputer control system and a switch control system in which a motor can be controlled by either the microcomputer control system or the switch control system in response to a switch operation. In the power window system, whether the microcomputer control system is in a normal state is judged by determining whether a clock signal is output from the microcomputer control system at each time a predetermined period of time passes of time passes by the microcomputer in the switch control system. Then, the microcomputer in the switch control system controls a switch device in such a manner that if the microcomputer control system is in a normal state, the motor is controlled by a signal from the microcomputer control system and if the microcomputer control system is not in a normal state, the motor is directly controlled by a switch operation.

However, since in the power window system having a multiplex control system, the microcomputer in the switch control system controls the switch device so as to switch the system between the microcomputer control system and the switch control system, if both of the microcomputers in the microcomputer control system and the switch control system run away, it is difficult to directly control the motor by the switch operation so that the convenience of the system deteriorates.

SUMMARY OF THE INVENTION

An object of the present invention is to provide a motor control apparatus capable of controlling a motor in response to a switch operation regardless of the state of a control circuit.

In order to achieve the above object, a motor control apparatus comprising: a control circuit A which outputs a first signal at each time a predetermined period of time passes in a case in which said control circuit A is in a normal state and stops output of the first signal at each time the predetermined period of time passes and outputs a third signal for controlling a motor on the basis of a second signal at a time when a switch is operated in a case in which said control circuit A is an abnormal state; an output circuit B which outputs a fourth signal in the case in which said first signal is output at each time the predetermined period of time passes and outputs a fifth signal made by reversing said fourth signal in a case in which said first signal is not output at each time the predetermined period of time passes; a first gate circuit C for passing said third signal in a case in which said fourth signal is output from said output circuit B; a second gate circuit D for passing said second signal in a case in which said fifth signal is output from said output circuit B; and a drive circuit E for driving said motor M by one of the third signal passing through said first gate circuit C and the second signal passing through said second gate circuit D.

Accordingly, the control circuit A outputs the first signal at each time the predetermined period of time passes in a case in which said control circuit A is in a normal state and on the contrary in a case in which said control circuit A is abnormal state, stops the output of the first signal at each time the predetermined period of time passes and outputs the third signal for controlling the motor M on the basis of the second signal at a time when the switch SW is operated. In this case, the third signal is, for example, a signal which continues until the motor drive is forcibly stopped in the case that the second signal continues for a predetermined time. Accordingly, for example, when this motor control apparatus is applied to the power window system, the third signal corresponds to a signal continuing until the motor drive is stopped and the like.

The output circuit B outputs the fourth signal in a case in which the first signal is output at each time the predetermined period of time passes and outputs the fifth signal made by reversing the fourth signal in a case in which the first signal is not output at each time the predetermined period of time passes.

The first gate circuit C passes the third signal when the fourth signal is output from the output circuit B and the second gate circuit D passes the second signal when the fifth signal is output from the output circuit B.

Accordingly, in a case in which the control circuit A is in a normal state, the first signal is output at each time the predetermined period of time passes, the fourth signal is output from the output circuit B and the third signal passes through the first gate circuit C. On the contrary, in a case in which the control circuit A is not in a normal state, the first signal is not output at each time the predetermined period of time passes, the fifth signal is output from the output circuit B and the second signal passes through the second gate circuit D.

Then, the drive circuit E drives the motor M in response to the third signal passing through the first gate circuit C or the second signal passing through the second gate circuit D. Accordingly, in a case in which the control circuit A is in a normal state, the motor M is driven by the third signal passing through the first gate circuit C and in a case in which the control circuit A is an abnormal state, the motor M is driven by the second signal passing through the second gate circuit D.

As mentioned above, since the motor M is driven by the second signal at a time when the switch SW is operated in a case in which the control circuit A is an abnormal state, the motor can be controlled in response to the operation of the switch SW without regard to the state of the control circuit.

A motor control apparatus comprising a first control circuit F and a second control circuit G and controlling a motor M by one of the first control circuit F and the second control circuit G in response to an operation of a switch, wherein, in a case in which said first control circuit F is in a normal state, said first control circuit F outputs a first signal at each time a predetermined period of time passes, and in a case in which said first control circuit F is in an abnormal state, said first control circuit F stops output of said first signal at each time the predetermined period of time passes, and in a case in which said first control circuit F is in a normal state and a switch is operated, on the basis of a second signal, said first control circuit F outputs a third signal for controlling a motor M, and wherein said second control circuit G comprises: a first AND circuit H, said third signal bring inputted to one input terminal of said first AND circuit H; a second AND circuit I, said second signal being inputted to one input terminal of said second AND circuit I; a NOT circuit J having an output terminal connected to another input terminal of said first AND circuit H; an output circuit K connected to an input terminal of said NOT circuit J and to another input terminal of said second AND circuit I, respectively, and continuously outputting a fourth signal of a low state to the input terminal of said NOT circuit J and the other input terminal of said second AND circuit I when said first signal is output at each time the predetermined period of time passes, and continuously outputting a fourth signal of a high state to the input terminal of said NOT circuit J and the other input terminal of said second AND circuit I when said first signal is not output at each time the predetermined period of time passes; and a drive circuit L for driving said motor M by one of the output of said first AND circuit H and the output of said second AND circuit I.

In accordance with the second aspect, the motor M is controlled by the operation of the switch SW through one of the first control circuit F and the second control circuit G.

Accordingly, the first control circuit F outputs the first signal at each time the predetermined period of time passes.

The output circuit K of the second control circuit continuously outputs the fourth signal of a low state to the input terminal of the NOT circuit J which is connected to the other input terminal of the first AND circuit H and the other input terminal of the second AND circuit I, respectively when the first signal is output at each time the predetermined period of time passes. Accordingly, the signal of a high state which is made by reversing the fourth signal of a low state in the NOT circuit J is input to the other input terminal of the first AND circuit H.

When the switch SW is operated in this state, the third signal is input to the one input terminal of the first AND circuit. As mentioned above, the signal is input to the both input terminals of the first AND circuit H and the signal is output from the output terminal of the first AND circuit H so that the drive circuit L drives the motor M.

In this case, if the second signal is input to the one input terminal of the second AND circuit I in which the signal of a low state is input to the other input terminal thereof, the signal is not output. Accordingly, the drive circuit L drives the motor M only by the signal output from the output terminal of the first AND circuit H in the case that the first control circuit is in the normal state.

On the contrary, the first control circuit F which is an abnormal state stops outputting the first signal at each time the predetermined period of time passes. In this case, the output circuit K continuously outputs the fourth signal of a high state to the input terminal of the above-mentioned NOT circuit I and the other input terminal of the second AND circuit F, respectively.

When the switch SW is operated in this state, the second signal at a time when the switch SW is operated is input to the one input terminal of the second AND circuit I. As mentioned above, the signal is input to the both input terminals of the second AND circuit F and the signal is output from the output terminal of the second AND circuit F so that the drive circuit L drives the motor M.

In this case, since a level of the fourth signal is in the high state, the fourth signal of a low state made by reversing the fourth signal of a high state by the NOT circuit J is input to the other input terminal of the first AND circuit H. Accordingly, even if the third signal is input to the first AND circuit H in this state, the signal is not output. Therefore, in the case that the first control circuit F is not in the normal state, the drive circuit L drives the motor M by the signal output from the output terminal of the second AND circuit I, that is, the second signal at a time when the switch SW is operated.

As mentioned above, the second control circuit G comprises the first AND circuit H having the one terminal to which the third signal made in response to the switch SW operation is input from the first control circuit F, the second AND circuit I having the one input terminal to which the second signal made by the switch SW operation is input and the output circuit connected to the other input terminal of the first AND circuit through the NOT circuit and connected to the other input terminal of the second AND circuit, and when the first signal is output at each time the predetermined period of time passes, the output circuit continuously outputs the fourth signal of a low state to the input terminal of the NOT circuit and the other input terminal of the second AND circuit F, respectively and when the first signal is not output at each time the predetermined period of time passes, the output circuit continuously outputs the fourth signal of a high state to the input terminal of the NOT circuit and the other input terminal of the second AND circuit F, respectively. Accordingly, in the case that the first signal is output at each time the predetermined period of time passes or that the first signal is not output at each time the predetermined period of time passes, the motor M can be driven in response to the operation of the switch SW.

In the mean time, a third aspect of the present invention is different from the second aspect of the present invention in the points that the output terminal of the NOT circuit is connected to the other input terminal of the second AND circuit, that the output circuit is respectively connected to the input terminal of the NOT circuit and the other input terminal of the first AND circuit, and that the output circuit continuously outputs the fourth signal of a high state to the input terminal of the NOT circuit and the other input terminal of the first AND circuit, respectively when the first signal is output at each time the predetermined period of time passes and continuously outputs the fourth signal of a low state to the input terminal of the NOT circuit and the other input terminal of the first AND circuit, respectively when the first signal is not output at each time the predetermined period of time passes.

In this case, it may be possible to provide a plurality of switches and to provide the first AND circuit and the second AND circuit in each of the switches.

BRIEF DESCRIPTION OF THE DRAWINGS

FIG. 1 is a perspective view which shows an inner structure of a driver's door in accordance with an embodiment of the present invention;

FIG. 5A is a drawing which shows a state of a NOR circuit of an RS-F.F. in the case that a microcomputer is in a normal state;

FIG. 5B is a drawing which shows a state of a NOR circuit of an RS-F.F. in the case that a microcomputer is not in a normal state;

DESCRIPTION OF THE PREFERRED EMBODIMENTS

Figure 2:
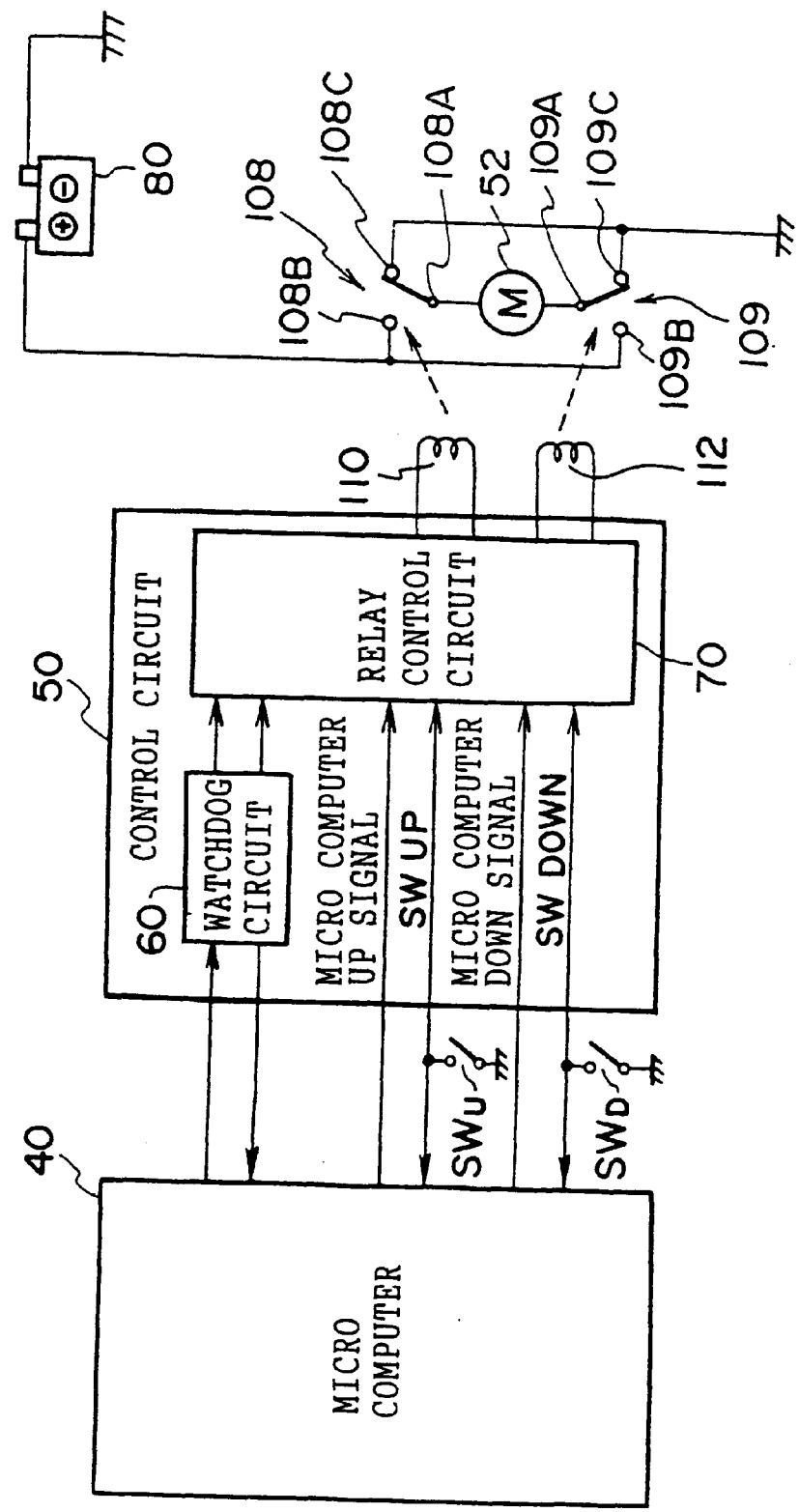
FIG. 2 is a circuit diagram of a motor control apparatus in accordance with the embodiment.

An embodiment in accordance with the present invention will be explained below with reference to the attached drawings. FIG. 1 shows an inner structure of a driver's door. As shown in FIG. 1, a motor 52 is provided within the driver's seat. The motor 52 is connected to a window regulator portion 46. The window regulator portion 46 is structured to be a so-called wire type and a wire is wound around a rotating plate 52A mounted to a drive shaft of the motor 52. An end portion of the wire is connected to a holding channel 54 for supporting a lower end portion of a door glass 100 and the holding channel 54 is further mounted to a main guide 56 in such a manner to move in a vertical direction. Accordingly, when the motor 52 is rotated in a normal and reverse direction, the driving force of rotation is transmitted through the wire so that the door glass 100 vertically moves along the glass guide 48. Further, the structure of the window regulator 46 may use an X-arm type or a so-called motor self-propelled type in which the motor itself moves along a rack without limitation of the wire type.

When the door glass 100 is moved upward by the motor 52, a peripheral end portion of the door glass 100 is fitted into a rubber weather strip (not shown) disposed within a frame 42A so as to close an opening of the door frame 42A. Further, when the door glass 100 is moved downward by the rotational drive of the motor 52, the opening of the frame 42A of the door 42 is opened.

Next, a control system will be explained below.

The control system comprises a microcomputer (corresponding to a control circuit or a first control circuit) 40 and a control circuit 50, as shown in FIG. 2. The control circuit 50 comprises a watchdog circuit (a signal output circuit) 60 and a relay control circuit 70. The microcomputer 40 and the relay control circuit 70 are connected to an up switch $SW_U$ for moving upward the door glass 100 of the driver's door and a down switch $SW_D$ for moving downward the door glass 100 of the driver's door.

In this system, when the up switch $SW_U$ is turned to an ON state, the microcomputer 40 detects this turning and outputs a microcomputer up signal to the relay control circuit 70 through a wire used exclusively for this purpose, and when the down switch $SW_D$ is turned to an ON state, the microcomputer 40 detects this turning and outputs a microcomputer down signal to the relay control circuit 70 through a wire used exclusively for this purpose. Further, when the up switch $SW_U$ and the down switch $SW_D$ is turned to an ON state, a switch up signal and a switch down signal are input to the relay control circuit 70 through respective personal lines.

Further, the microcomputer 40 outputs a clock signal to the watchdog circuit 60 at each time a predetermined period of time passes in a normal state. The watchdog circuit 60 outputs a clock signal to the relay control circuit 70 in response to a clock signal from the microcomputer, and when the clock signal is not input from the microcomputer 40 at each time the predetermined period of time passes, the watchdog circuit outputs a reset signal to the microcomputer 40 and the relay control circuit 70.

Figure 3:
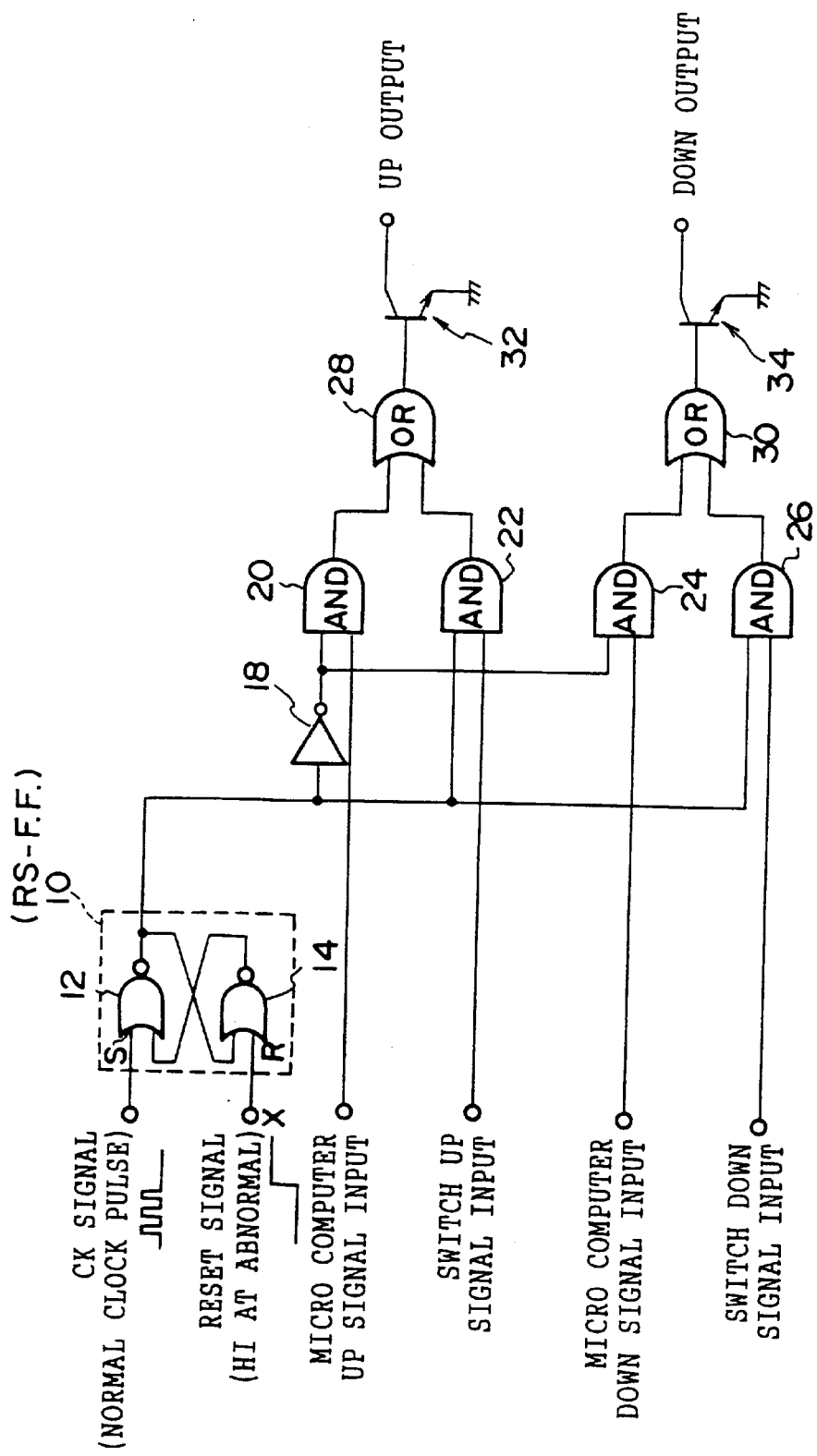
FIG. 3 is a circuit diagram of a relay control circuit.

Next, the relay control circuit 70 will be explained below. The relay control circuit 70 is provided with a reset set flip flop (hereinafter refer to a RS-F.F.) 10 connected to the watchdog circuit 60, as shown in FIG. 3. The RS-F.F. 10 is provided with a NOR circuit 12 and a NOR circuit 14. A clock signal is input to an input terminal S of the NOR circuit 12 from the watchdog circuit 60. A reset signal is input to an input terminal R of the NOR circuit 14 from the watchdog circuit 60. The other input terminal of the NOR circuit 12 is connected to an output terminal of the NOR circuit 14 and the other input terminal of the NOR circuit 14 is connected to an output terminal of the NOR circuit 12.

In this structure, the relay control circuit 70 is provided with four AND circuits 20, 22, 24 and 26.

The microcomputer 40 is connected to an input terminal of the AND circuit 20 (a first gate circuit) and the microcomputer up signal is input thereto.

The up switch $SW_U$ is connected to an input terminal of the AND circuit 22 (a second gate circuit) and the switch up signal is input thereto.

The microcomputer 40 is connected to an input terminal of the AND circuit 24 (the first gate circuit) and the microcomputer down signal is input thereto.

The down switch $SW_D$ is connected to an input terminal of the AND circuit 26 (the second gate circuit) and the switch down signal is input thereto.

Further, the other input terminal of the AND circuit 20 and the other input terminal of the AND circuit 24 are connected to an output terminal of a NOT circuit 18.

Still further, an input terminal of the NOT circuit, the other input terminal of the AND circuit 22 and the other input terminal of the AND circuit 26 are connected to the RS-F.F. 10.

An output terminal of the AND circuit 20 and an output terminal of the AND circuit 22 are connected to an input terminal of an OR circuit 28. An output terminal of the AND circuit 24 and an output terminal of the AND circuit 26 are connected to an input terminal of an OR circuit 30.

An output terminal of the OR circuit 28 is connected to a base of a transistor 32. An output terminal of the OR circuit 30 is connected to a base of a transistor 34. Further, a collector of the transistor 32 is connected to a first relay coil 110 and a collector of the transistor 34 is connected to a second relay coil 112. When the transistor 32 is turned to an ON state, the first relay coil 110 is excited and when the transistor 34 is turned to an ON state, the second relay coil 112 is excited.

On the contrary, as shown in FIG. 2, a first relay switch 108 is disposed in a position corresponding to the first relay coil 110. A common terminal 108A of the first relay switch 108 is connected to an end of the motor 52. Further, a first contact 108B is connected to a plus terminal of a battery 80 and a second contact 108C is electrically grounded. Still further, when the first relay coil 110 is not excited, the first relay switch 108 is switched to the second contact 108C.

On the contrary, a second relay switch 109 is disposed in a position corresponding to the second relay coil 112. A common terminal 109A of the second relay switch 109 is connected to the other end of the motor 52. Further, a first contact 109B is connected to the plus terminal of the battery 80 and a second contact 109C is electrically grounded. Still further, when the second relay coil 112 is not excited, the second relay switch 109 is switched to the second contact 109C.

In this structure, when the first relay coil 110 is excited, the first relay switch 108 is switch to the first contact 108B, thereby applying an electric current from the one end of the motor 52 to the other end thereof so that the motor 52 is normally rotated and the door glass 100 is moved upward (in a closing direction). Further, when the second relay coil 112 is excited, the second relay switch 109 is switched to the first contact 109B, thereby applying an electric current from the other end of the motor 52 to the one end so that the motor 52 is reversely rotated and the door glass 100 is moved downward (in a opening direction).

Next, an operation of the present aspect will be explained below. Further, explanation will be given by separating to a case that the microcomputer 40 is in a normal state and a case that the microcomputer 40 is not in a normal state.

Figure 4:
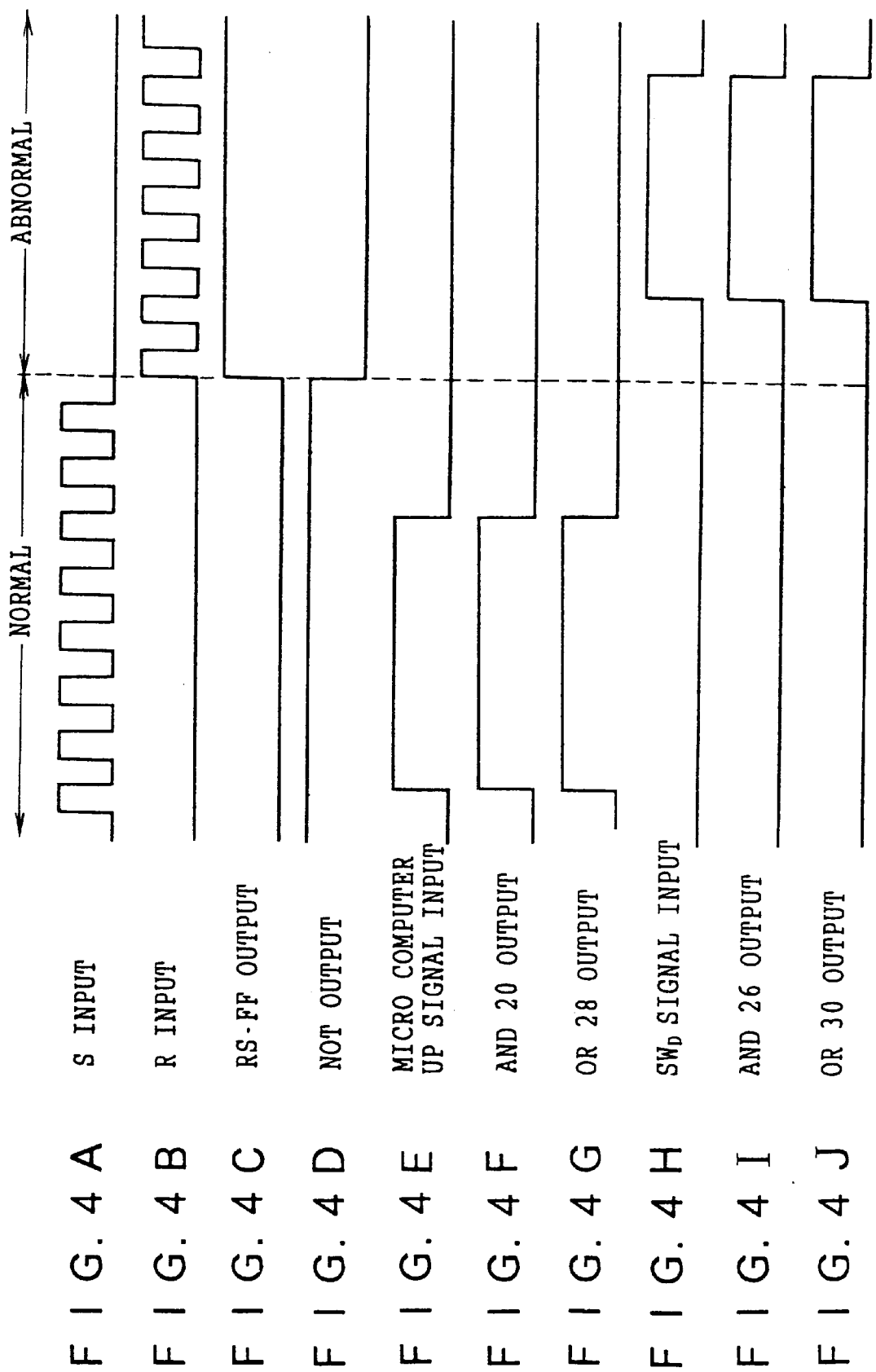
FIG. 4A is a timing chart which shows a clock signal output from a microcomputer.
FIG. 4B is a timing chart which shows a reset signal output from a watchdog circuit.
FIG. 4C is a timing chart which shows a signal output from an RS-F.F.
FIG. 4D is a timing chart which shows a signal output from a NOT circuit.
FIG. 4E is a timing chart which shows a microcomputer UP signal output from a microcomputer.
FIG. 4F is a timing chart which shows a signal output from an AND circuit 20.
FIG. 4G is a timing chart which shows a signal output from an OR circuit 28.
FIG. 4H is a timing chart which shows a signal output from a DOWN switch $SW_D$.
FIG. 4I is a timing chart which shows a signal output from an AND circuit 26.
FIG. 4J is a timing chart which shows a signal output from an OR circuit 30.
Figure 6:
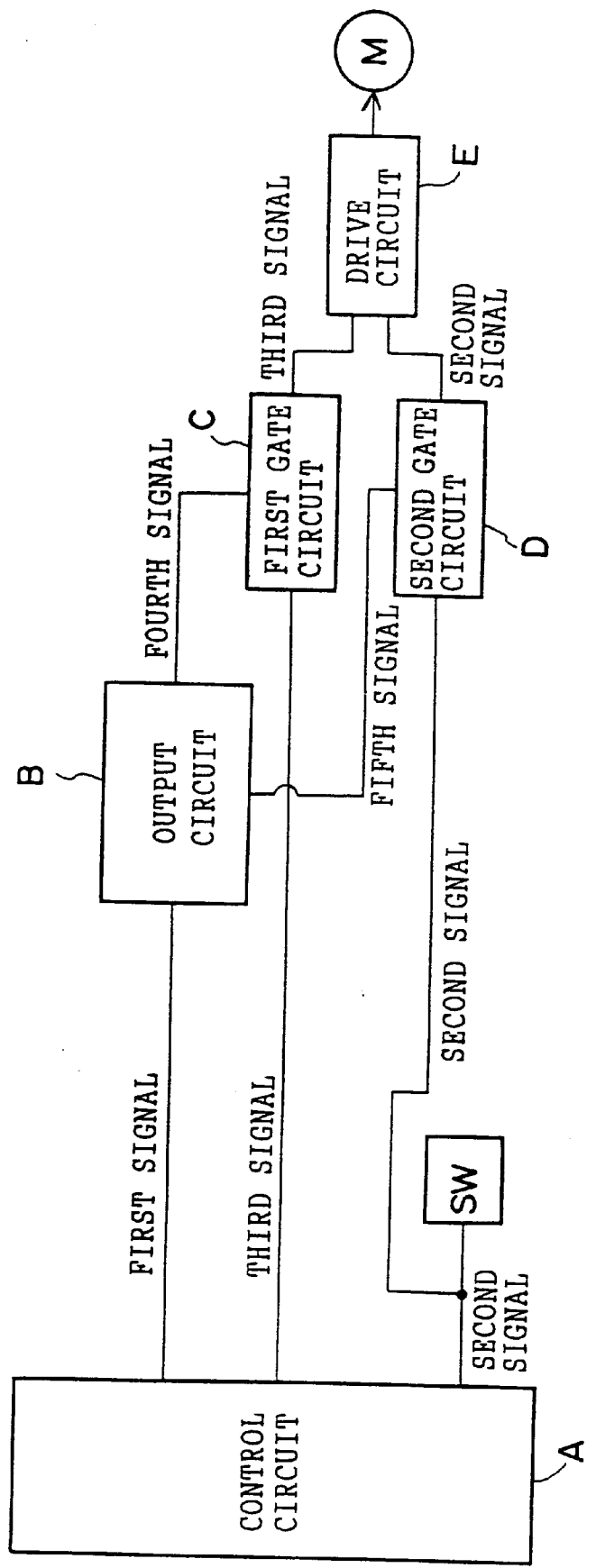
FIG. 6 is a block diagram which shows elements of a first aspect in accordance with the present invention.
Figure 7:
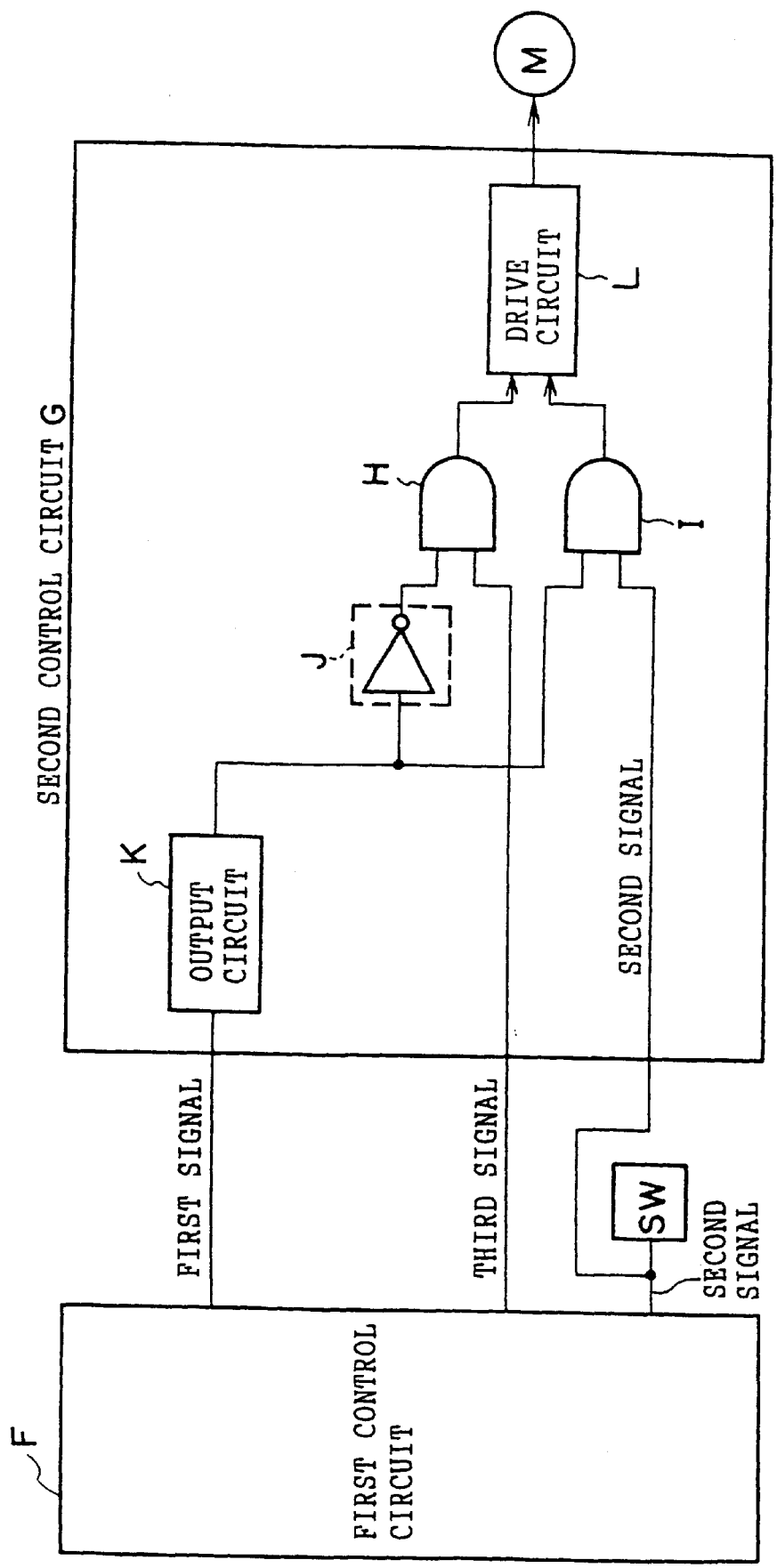
FIG. 7 is a block diagram which shows elements of a second aspect in accordance with the present invention.

In the case that the microcomputer 40 is in a normal state, the signal is output to the watchdog circuit 60 at each time a predetermined period of time passes as shown in FIG. 4A. The watchdog circuit 60 inputting the clock signal in the above manner outputs a clock signal (a set signal) to the one input terminal S of the NOR circuit 12 of the RS-F.F. 10 in the relay control circuit 70 at a timing as shown in FIG. 4A.

In the case that the clock signal is input from the microcomputer 40 as in a manner mentioned above, a level of the reset signal from the watchdog circuit 60 becomes a low level as shown in FIG. 4B.

Accordingly, as shown in FIG. 5A, when a set signal H (in a high state) is input to the one input terminal S of the NOR circuit 12, the RS-F.F. 10 is set and the output level becomes L (a low state). Accordingly, since a signal (a reset signal) input to the one input terminal R of the NOR circuit 14 is a low level, even when the set signal H becomes a low state, the output is held in a low state. In this state, the output level of the NOT circuit 18 becomes a high state as shown in FIG. 4D.

As mentioned above, the signal of a high state is input to the other input terminal of the AND circuit 20 from the NOT circuit 18, the signal of a low state is input to the other input terminal of the AND circuit 22 from the RS-F.F. 10, the signal of a high state is input to the other input terminal of the AND circuit 24 from the NOT circuit 18 and the signal of a low state is input to the other input terminal of the AND circuit 26 from the RS-F.F. 10.

As mentioned above, since the signal of a high state is input to the respective input terminals of the AND circuit 20 and the AND circuit 24, for example, as shown in FIG. 4E, when the up switch $Sw_U$ is turned to an ON state and the microcomputer up signal is input from the microcomputer 40, a synchronous signal of the microcomputer up signal is output to the OR circuit 28 from the AND circuit 20, as shown in FIG. 4F. Accordingly, the OR circuit 28 outputs a synchronous signal of the microcomputer up signal to the base of the transistor 32, as shown in FIG. 4G. In accordance with this, the transistor 32 is turned to an ON state and the first relay coil 110 is excited so that the door glass 100 is moved upward (in a closed direction).

Further, when the down switch $SW_D$ is turned to an ON state, the microcomputer down signal is also input to the AND circuit 24 from the microcomputer 40 and a synchronous signal of the microcomputer down signal is output to the OR circuit 30. Accordingly, a synchronous signal of the microcomputer down signal is output to the base of the transistor 34 from the OR circuit 30. Therefore, the transistor 32 is turned to an ON state and the second relay coil 112 is excited so that the door glass 100 is moved downward (in an opened direction).

Next, a case in which the microcomputer 40 is not in a normal state will be explained. In the case that the microcomputer 40 is not in a normal state, as shown in FIG. 4A, the clock signal is not output from the microcomputer 40. As mentioned above, when the clock signal is not output from the microcomputer 40, as shown in FIG. 4B, the watchdog circuit 60 intermittently outputs the reset signal to the microcomputer 40 and the relay control circuit 70 (the NOR circuit 14 of the RS-F.F. 10) due to lack of the clock signal input.

In the case that the reset signal is input from the watchdog circuit 60 as in a manner mentioned above, the RS-F.F. 10 is reset and the output becomes H (a high state) as shown in FIG. 5B. The output of a high state is input to the NOT circuit 18, the AND circuit 22 and the AND circuit 28. Since the output of a high state is input to the NOT circuit 18, the output from the NOT circuit 18 becomes a low level as shown in FIG. 4D.

As in a manner mentioned above, the signal of a low state is input to the other input terminal of the AND circuit 20 from the NOT circuit 18, the signal of a high state is input to the other input terminal of the AND circuit 22 from the RS-F.F. 10, the signal of a low state is input to the other input terminal of the AND circuit 24 from the NOT circuit 18 and the signal of a high state is input to the other input terminal of the AND circuit 26 from the RS-F.F. 10.

As mentioned above, since the signal in a high level is input to the AND circuit 22 and the AND circuit 28 from the RS-F.F. 10, for example, as shown in FIG. 4H, when the down switch $SW_D$ is turned to an state and the switch down signal is input to the AND circuit 26 at a timing as shown in FIG. 4H, the synchronous signal of the switch down signal is input to the OR circuit 30 as shown in FIG. 4I. In accordance with this, the transistor 34 is turned to an ON state and the first relay coil 112 is excited so that the door glass 100 is moved downward (in an opened direction).

Further, when the down switch $Sw_U$ is turned to an ON state, the switch up signal is input to the AND circuit 22 and the synchronous signal of the switch up signal is input to the OR circuit 28. Accordingly, the OR circuit 28 outputs the synchronous signal of the switch down signal to the base of the transistor 32. Therefore, the transistor 32 is turned to an ON state and the first relay coil 110 is excited so that the door glass 100 is moved upward (in a closed direction).

Further, in the case that the microcomputer 40 is in a normal state, since the output from the RS-F.F. 10 is in a low level, the signal in a low level is input to the AND circuit 22 and the AND circuit 26. Accordingly, even when the switch up signal and the switch down signal are input by an operation of the down switch $SW_D$, no signal is output from the AND circuit 22 and the AND circuit 26.

Still further, in the case that the microcomputer 40 is not in a normal state, since the level of the output from the NOT circuit 18 becomes low, the signal in a low level is input to the AND circuit 22 and the AND circuit 24.

As explained above, the control circuit comprises the AND circuit 20 for inputting the microcomputer up signal to the one input terminal, the AND circuit 22 for inputting the switch up signal by the operation of the switch SW to the one input terminal, the AND circuit 24 for inputting the microcomputer down signal and the AND circuit 26 for inputting the switch down signal by the operation of the switch SW to the one input terminal, and outputs the signal of a high state to the other input terminal of the AND circuit 22 and 26 when the clock signal is not output from the microcomputer. Accordingly, even in the case that the clock signal is not output, when the switch up signal by the operation of the switch SW is input to the AND circuit 22 and the switch down signal by the operation of the switch SW is input to the AND circuit 26, the motor M can be driven in response to the switch SW operation.

In the above embodiment, the NOT circuit connects between the RS-F.F. 10 and the AND circuits 20, 24, however, the present invention is not limited to this embodiment. The structure may be constructed such that the RS-F.F. 10 is connected to the AND circuits 20, 24 and the NOT circuit is connected between the AND circuit 22, 26 and the RS-F.F. 10, respectively and that the RS-F.F. 10 outputs the signal of a high state when the clock signal is output from the microcomputer 40 at each time the predetermined period of time passes and outputs the signal of a low state when the clock signal is not output from the microcomputer 40 at each time the predetermined period of time passes.

Further, in the above embodiment, the explanation is given to the embodiment having the up switch $SW_U$ and the down switch $SW_D$ for moving the door glass 100 of the driver's seat upward and downward, however, the present invention is not limited to this embodiment. The structure may be constructed such that the other seat is provided with an up switch and a down switch for moving a door glass in the seat or that the driver's seat is provided with a up switch and a down switch for moving a door glass in the seat. In this case, an AND circuit for inputting a signal from a microcomputer (a microcomputer up signal and the like) and an AND circuit for inputting a signal from a switch (a switch up signal and the like) are provided in correspondence to each of the switches.

Still further, in the above embodiment, the RS-F.F. 10 and the AND circuit are provided, however, the present invention is not limited to this structure. The structure may be constructed such that there is provided with an output circuit for outputting a predetermined signal in the case that a clock signal is output from a microcomputer at each time a predetermined period of time passes and for outputting a signal made by reversing the predetermined signal in the case that the clock signal is not output from the microcomputer at each time the predetermined period of time passes and further provided with a gate circuit for passing the signal from the microcomputer in the case that the predetermined signal is output from the output circuit and a gate circuit for passing a signal at a time when the switch is operated in the case that the predetermined signal is output from the output circuit.

Furthermore, in the above embodiment, the explanation is given to the embodiment of the microcomputer, however, the present invention is not limited to this embodiment.

Moreover, in the above embodiment, the explanation is given to the embodiment of the power window system, however, the present invention is not limited to this embodiment. The present invention can be applied to an apparatus for controlling a motor by an operation of a switch.

What is claimed is:

1. A motor control apparatus comprising:

a control circuit A which outputs a first signal at each time a predetermined period of time passes in a case in which said control circuit A is in a normal state and stops output of the first signal at each time the predetermined period of time passes and outputs a third signal for controlling a motor on the basis of a second signal at a time when a switch is operated in a case in which said control circuit A is an abnormal state;

an output circuit B which outputs a fourth signal in a case in which said first signal is output at each time the predetermined period of time passes and outputs a fifth signal made by reversing said fourth signal in a case in which said first signal is not output at each time the predetermined period of time passes;

a first gate circuit C for passing said third signal in a case in which said fourth signal is output from said output circuit B;

a second gate circuit D for passing said second signal in a case in which said fifth signal is output from said output circuit B; and a drive circuit E for driving said motor M by one of the third signal passing through said first gate circuit C and the second signal passing through said second gate circuit D.

2. A motor control apparatus as recited in claim 1, wherein said third signal is a signal which continues until the motor drive is forcibly stopped in a case in which said second signal continues for a predetermined time.

3. A motor control apparatus as recited in claim 1, wherein said output circuit includes a reset set flip flop which, in a case in which said first signal is output at each time the predetermined period of time passes, is set so as to output said fourth signal, and in a case in which said first signal is not output at each time the predetermined period of time passes, is reset so as to output said fifth signal.

4. A motor control apparatus as recited in claim 1, wherein said output circuit comprises:

a signal output circuit which is connected to said control circuit, inputs said first signal, outputs a set signal synchronized with said first signal and having the same period as that of said first signal, and outputs a reset signal when said first signal is not input at each time the predetermined period of time passes; and a reset set flip flop which is connected to said signal output circuit and inputs said set signal and said reset signal, and in a case in which the set signal is input from the signal output circuit, said reset set flip flop is set so as to output said fourth signal, and in a case in which said reset signal is input, said reset set flip flop is reset so as to output said fifth signal.

5. A motor control apparatus as recited in claim 4, wherein said reset set flip flop comprises a first NOR circuit provided with an input terminal for inputting said set signal and a second NOR circuit provided with an input terminal for inputting said reset signal, and wherein an output terminal of said second NOR circuit is connected to the other input terminal of said first NOR circuit and an output terminal of said first NOR circuit is connected to said first gate circuit, said second gate circuit and the other input terminal of said second NOR circuit.

6. A motor control apparatus as recited in claim 1, wherein said drive circuit comprises:
   an OR circuit having an input terminal which is connected to said first gate circuit and to which said third signal from said first gate circuit is inputted, and having another input terminal which is connected to said second gate circuit and to which said second signal from said second gate circuit is inputted; and
   a motor drive circuit connected to said OR circuit and driving said motor in response to a signal output from said OR circuit.

7. A motor control apparatus comprising a first control circuit F and a second control circuit G and controlling a motor M by one of the first control circuit F and the second control circuit in response to an operation of a switch,
   wherein, in a case in which said first control circuit F is in a normal state, said first control circuit F outputs a first signal at each time a predetermined period of time passes, and in a case in which said first control circuit F is in an abnormal state, said first control circuit F stops output of said first signal at each time the predetermined period of time passes, and in a case in which said first control circuit F is in a normal state and a switch is operated, on the basis of a second signal, said first control circuit F outputs a third signal for controlling a motor M, and
   wherein said second control circuit G comprises:
      a first AND circuit H, said third signal bring inputted to one input terminal of said first AND circuit H;
      a second AND circuit I, said second signal being inputted to one input terminal of said second AND circuit I;
      a NOT circuit J having an output terminal connected to another input terminal of said first AND circuit H;
      an output circuit K connected to an input terminal of said NOT circuit J and to another input terminal of said second AND circuit I, respectively, and continuously outputting a fourth signal of a low state to the input terminal of said NOT circuit J and the other input terminal of said second AND circuit I when said first signal is output at each time the predetermined period of time passes, and continuously outputting a fourth signal of a high state to the input terminal of said NOT circuit J and the other input terminal of said second AND circuit I when said first signal is not output at each time the predetermined period of time passes; and
      a drive circuit L for driving said motor M by one of the output of said first AND circuit H and the output of said second AND circuit I.

8. A motor control apparatus as recited in claim 7, wherein said third signal is a signal which continues until the motor drive is forcibly stopped in a case in which the second signal continues for a predetermined time.

9. A motor control apparatus as recited in claim 7, wherein said output circuit includes a reset set flip flop which is connected to an input terminal of said NOT circuit and the other input terminal of said second AND circuit, and in a case in which said first signal is output at each time the predetermined period of time passes, said reset set flip flop is set so as to continuously output a fourth signal of a low state to the input terminal of the NOT circuit and the other input terminal of the second AND circuit respectively, and in a case in which said first signal is not output at each time the predetermined period of time passes, said reset set flip flop is reset so as to continuously output the fifth signal of a high state to the input terminal of the NOT circuit and the other input terminal of the second AND circuit respectively.

10. A motor control apparatus as recited in claim 7, wherein said output circuit comprises:
    a signal output circuit which is connected to said first control circuit, inputs said first signal, outputs a set signal synchronized with said first signal and having the same period as that of the first signal, and outputs a reset signal when said first signal is not input at each time the predetermined period of time passes; and
    a reset set flip flop which is connected to the input terminal of said NOT circuit, the other input terminal of said second AND circuit and said signal output circuit and inputs said set signal and said reset signal, and in a case in which the set signal is input from the signal output circuit, said reset set flip flop is set so as to continuously output the fourth signal of a low state to the input terminal of the NOT circuit and the other input terminal of the second AND circuit respectively, and in a case in which said reset signal is input, said reset set flip flop is reset so as to continuously output the fourth signal of a high state to the input terminal of the NOT circuit and the other input terminal of the second AND circuit.

11. A motor control apparatus as recited in claim 10, wherein said reset set flip flop comprises a first NOR circuit provided with an input terminal for inputting said set signal and a second NOR circuit provided with an input terminal for inputting said reset signal, and wherein an output terminal of said second NOR circuit is connected to the other input terminal of said first NOR circuit and an output terminal of said first NOR circuit is connected to said input terminal of said NOT circuit, the other input terminal of said second AND circuit and the other input terminal of said second NOR circuit.

12. A motor control apparatus as recited in claim 7, wherein said drive circuit comprises:
    an OR circuit having an input terminal which is connected to said first AND circuit and to which the signal from said first AND circuit is inputted and having another input terminal which is connected to said second AND circuit and to which the signal from said second AND circuit is inputted; and
    a motor drive circuit connected to said OR circuit and driving said motor in response to a signal output from said OR circuit.

13. A motor control apparatus as recited in claim 7, wherein a door glass is moved in accordance with drive by said motor.

14. A motor control apparatus comprising a first control circuit and a second control circuit and controlling a motor by one of the first control circuit and the second control circuit in response to an operation of a switch,
    wherein, in a case in which said first control circuit is in a normal state, said first control circuit outputs a first signal at each time a predetermined period of time passes, and in a case in which said first control circuit is in an abnormal state, said first control circuit stops output of said first signal at each time the predetermined period of time passes, and in a case in which said first control circuit is in a normal state and a switch is operated, on the basis of a second signal, said first control circuit outputs a third signal for controlling a motor, and wherein said second control circuit comprises:
a first AND circuit, said third signal being inputted to one input terminal of said first AND circuit;
a second AND circuit, said second signal being inputted to one input terminal of said second AND circuit;
a NOT circuit having an output terminal connected to another input terminal of said second AND circuit;
an output circuit connected to an input terminal of said NOT circuit and to another input terminal of said first AND circuit, respectively, and continuously outputting a fourth signal of a high state to the input terminal of said NOT circuit and the other input terminal of said first AND circuit when said first signal is output at each time the predetermined period of time passes, and continuously outputting a fourth signal of a low state to the input terminal of said NOT circuit and the other input terminal of said first AND circuit when said first signal is not output at each time the predetermined period of time passes; and
a drive circuit for driving said motor by one of the output of said first AND circuit and the output of said second AND circuit.

15. A motor control apparatus as recited in claim 14, wherein said third signal is a signal which continues until the motor drive is forcibly stopped in a case in which the second signal continues for a predetermined time.

16. A motor control apparatus as recited in claim 14, wherein said output circuit includes a reset set flip flop which is connected to an input terminal of said NOT circuit and the other input terminal of said first AND circuit, and in a case in which said first signal is output at each time the predetermined period of time passes, said reset set flip flop is set so as to continuously output a fourth signal of a high state to the input terminal of the NOT circuit and the other input terminal of the first AND circuit respectively, and in a case in which said first signal is not output at each time the predetermined period of time passes, said reset set flip flop is reset so as to continuously output the fifth signal of a low state to the input terminal of the NOT circuit and the other input terminal of the first AND circuit, respectively.

17. A motor control apparatus as recited in claim 14, wherein said output circuit comprises:
a signal output circuit which is connected to said first control circuit, inputs said first signal, outputs a set signal synchronized with said first signal and having the same period as that of the first signal, and outputs a reset signal when said first signal is not input at each time the predetermined period of time passes; and
a reset set flip flop which is connected to the input terminal of said NOT circuit, the other input terminal of said first AND circuit and said signal output circuit and inputs said set signal and said reset signal, and in a case in which the set signal is input from the signal output circuit, said reset set flip flop is set so as to continuously output the fourth signal of a high state to the input terminal of the NOT circuit and the other input terminal of the first AND circuit respectively, and in a case in which said reset signal is input, said reset set flip flop is reset so as to continuously output the fourth signal of a low state to the input terminal of the NOT circuit and the other input terminal of the first AND circuit.

18. A motor control apparatus as recited in claim 17, wherein said reset set flip flop comprises a first NOR circuit provided with an input terminal for inputting said set signal and a second NOR circuit provided with an input terminal for inputting said reset signal, and wherein an output terminal of said second NOR circuit is connected to the other input terminal of said first NOR circuit and an output terminal of said first NOR circuit is connected to said input terminal of said NOT circuit, the other input terminal of said first AND circuit and the other input terminal of said second NOR circuit.

19. A motor control apparatus as recited in claim 14, wherein said drive circuit comprises:
an OR circuit having an input terminal which is connected to said first AND circuit and to which the signal from said first AND circuit is inputted and having another input terminal which is connected to said second AND circuit and to which the signal from said second AND circuit is inputted; and
a motor drive circuit connected to said OR circuit and driving said motor in response to a signal output from said OR circuit.

20. A motor control apparatus as recited in claim 14, wherein a door glass is moved in accordance with drive by said motor.

* * * * *